358-140. OR 2,813,148 SR

SEARCH ROOM

Nov. 12, 1957 L. PENSAK 2,813,148

TELEVISION APPARATUS

Filed Jan. 5, 1954 4 Sheets-Sheet 1

T5055

INVENTOR.
LOUIS PENSAK
BY [signature]
ATTORNEY

INVENTOR.
LOUIS PENSAK
BY [signature]
ATTORNEY

TELEVISION APPARATUS

Filed Jan. 5, 1954 4 Sheets-Sheet 3

INVENTOR.
LOUIS PENSAK
BY [signature]
ATTORNEY

Nov. 12, 1957 L. PENSAK 2,813,148

TELEVISION APPARATUS

Filed Jan. 5, 1954 4 Sheets-Sheet 4

INVENTOR.

LOUIS PENSAK

BY [signature]

ATTORNEY

United States Patent Office 2,813,148 Patented Nov. 12, 1957

2,813,148

TELEVISION APPARATUS

Louis Pensak, Princeton, N. J., assignor to Radio Corporation of America, a corporation of Delaware Application January 5, 1954, Serial No. 402,299

The terminal fifteen years of the term of the patent to be granted has been disclaimed 8 Claims. (Cl. 178—6.8)

The present invention relates to television apparatus and, more particularly, to apparatus for converting television signals derived in accordance with a first set of scanning frequencies to signals which accord with a different set of frequency standards.

What with the existence of different television standards in various areas of the world, the problem of conversion from one set of standards to another has been the subject of many proposals. Prior systems in the field may be divided into two main categories, namely, the "intermediate photographic film" technique wherein received television images are recorded as density variations on motion picture film to be rescanned for transmission under a different set of standards, and, secondly, the so-called "instantaneous transformation of signals." Some typical examples of prior systems of both types are set forth in detail in an article entitled "Standards Conversion of Television Signals," by V. K. Zworykin and E. G. Ramberg, which appeared in the January 1952 issue of Electronics, page 86 et. sec. The present invention resides in a system of the latter type, that is, one which produces substantially instantaneous conversion without the step of photographic recording.

It is a primary object of the present invention to provide new and improved apparatus for converting television signals from a first set of standards to a different set of standards.

Since two given sets of television standards may require both different "line" and "frame" rates and since it is customary to employ "interlaced fields" for improved definition, as is well known, the conversion problem may be said to have two primary aspects. The first is the partial loss of vertical resolution as a result of the different numbers of lines per frame, which is characteristic of all known proposals and the second is the matter of "storage" to correct for the difference in frame rates The latter aspect may be subdivided in accordance with whether the received signal has a greater or lesser frame rate than the signal to be transmitted.

Hence it is another object of this invention to provide signal standards converting means, which means are equally applicable to cases requiring either increasing or decreasing of frame rates.

In the usual method of transmission, it has been the practice to "lock" the synchronizing (sync) signal generators to the power line frequency of the area in which the receivers are located in order to maintain hum disturbances of the picture stationary. Recent experience has demonstrated, however, that present-day television receivers are sufficiently free from such difficulties that the locking of a transmitter to the power line frequency may be ignored. In view of this freedom from power line lock-in, the present invention may, as will appear more fully hereinafter, be employed without deleterious effects in that regard.

The present invention is predicated upon the fact that, when two sets of frame rates can be made precisely commensurate, information is available as to which of a series of successive frames will contain artifacts and means may be provided for precluding their admission to the retransmitted signal. As employed herein, the term "commensurate" should be understood as meaning a condition wherein different field or frame rates are locked with respect to each other in such manner that their respective synchronizing pulses coincide in time at regular intervals determined by the ratio of the rates.

In a case in which a received signal from a remote transmitter is to be re-transmitted at a higher field rate, as through the agency of a camera which reads the images produced on a kinescope screen, it will be appreciated that certain of the fields produced by the scanning device will be blank or contain blank portions. Conversely, where the local transmitter operates at a lower field rate than that of the remote transmitter, the reproduced signal will ordinarily contain duplicate information which results in excessively bright portions. Such blank portions and overly bright regions are considered as artifacts herein, by reason of their undesired effect on the image produced from the re-transmitted signal.

It is, therefore, a further object of the present invention to provide means for anticipating and preventing the inclusion of artifacts in a signal derived under either of the conditions set forth above.

In accordance with a specific embodiment of the invention, an incoming video signal produced by scanning at a first field rate is detected and applied to an image-reproducing device such as a kinescope. The image is focused onto the image-receiving screen of a camera tube whose scanning beam is deflected at a different field rate. Deflection signals for the camera are derived from a generator which is "locked in" with the sync information contained in the received signal, whereby to render the two scanning rates commensurate. In this fashion, those camera fields which will contain artifacts may be anticipated by suitable means provided for the purpose. Storage tube means are caused to store certain fields bearing useful information, which stored fields are substituted in the out-going signal for the undesired fields.

Thus, a further object of the invention is the provision of means for anticipating those camera fields which will contain certain artifacts and for storing and substituting useful fields therefor.

Additional objects and advantages of the present invention will become apparent to persons skilled in the art from a study of the following detailed description of the accompanying drawing, in which.

Figure 1:
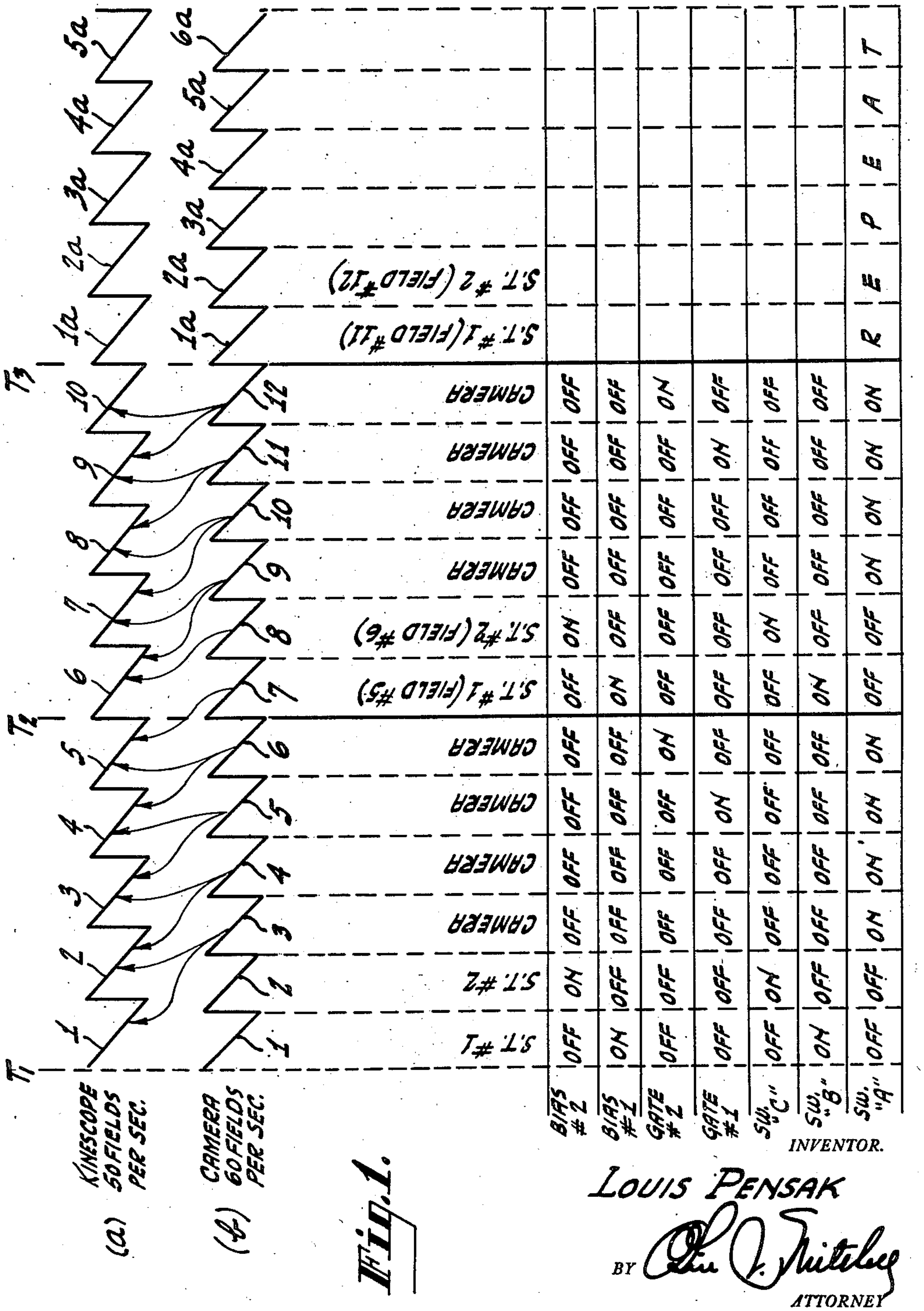
Fig. 1 illustrates by way of waveforms and operational chart the operation of the present invention in one situation.

Referring to the drawing, and, more particularly, to Fig. 1 thereof, there is illustrated one of the two possible situations which can arise in the matter of converting from one set of standards to another. Waveform (*a*) is indicative of successive fields 1, 2, 3, 4, 5 etc. of an incoming signal based on a 50-field-per-second standard, each sawtooth being representative of one such field and the vertical height of each sawtooth being indicative of the vertical travel of a kinescope scanning beam through a field. Waveform (*b*) is a similar waveform illustrative of a 60-field-per-second scanning rate to which the incoming signal is to be converted for retransmission. From the two waveforms, it may be seen that at certain times, namely, $T_1$, $T_2$ and $T_3$ there is coincidence of their leading edges. These times occur specifically after every fifth field of waveform (*a*) and after every sixth field of waveform (*b*), which times are in direct proportion to the ratio of the received and retransmitted feed scanning rates of 50 cycles and 60 cycles per second, respectively.

The above facts represent only the difference in field scanning rates and it should be borne in mind that, in all probability, the horizontal or line rates of the remote and local transmitters will also differ. For example, standards which prevail in the western hemisphere provide for operation with 525 lines, 60 field interlaced, while those in most countries of continental Europe are 625 lines, 50 field interlaced. These two sets are given only by way of illustration but should demonstrate the fact that, in addition to different field rates, the pitch of the scanning lines is also different, so that the scanning lines of a local station's camera will cross the lines of the received image. Throughout the following portion of the specification, therefore, it will be assumed that the signal received from a remote transmitter for conversion and retransmission by the local transmitter differs from local standards both in line and field rates, in order to show the full capabilities of the present invention.

Figure 2:
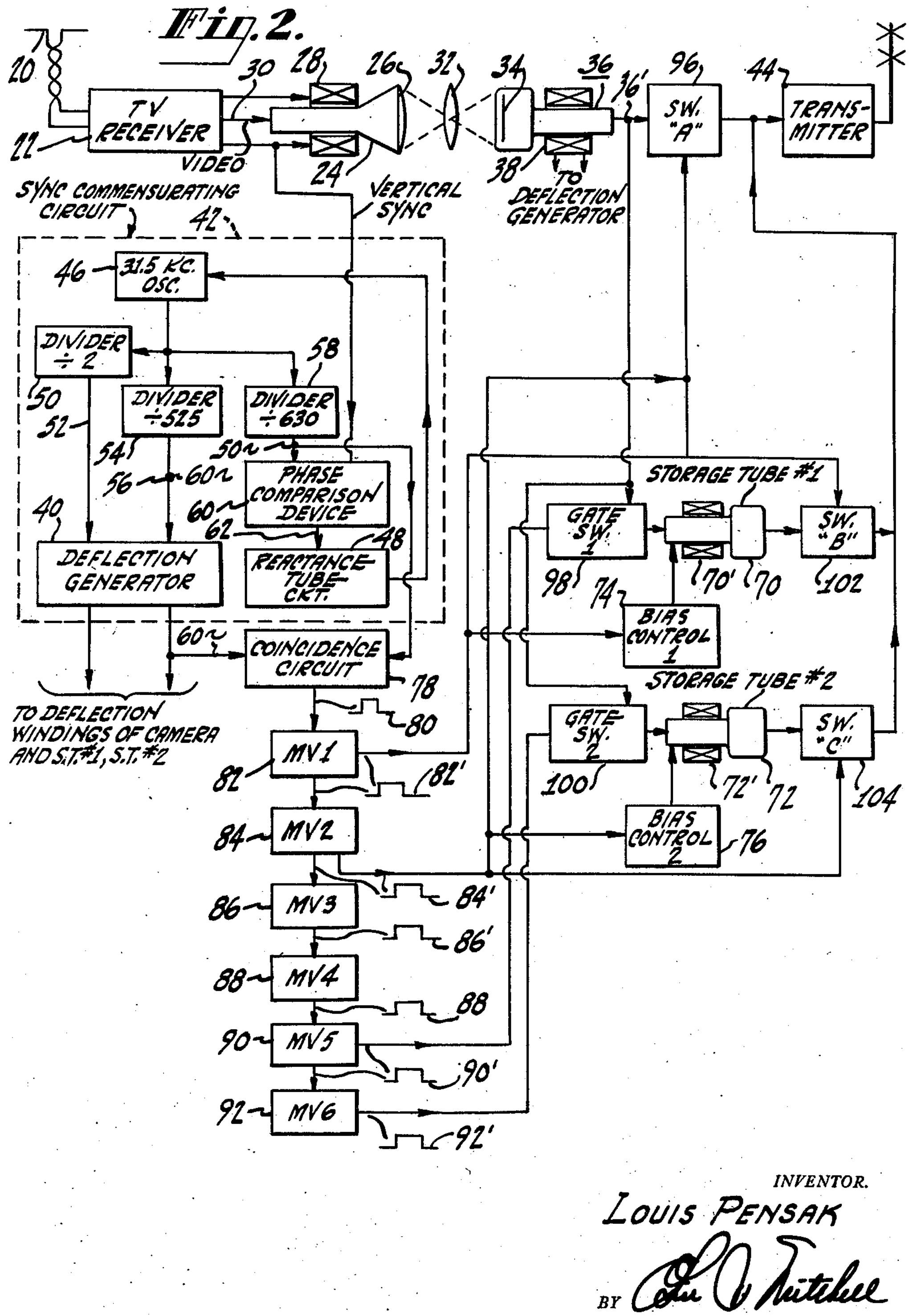
Fig. 2 is a block diagram of television apparatus embodying the principles of the invention.

Fig. 2 illustrates, by way of block diagram, apparatus in accordance with the invention for signal conversion. A television signal from a remote transmitter (not shown) which, for example, is operating on a 50-field rate is intercepted by an antenna 20 which applies it to a television receiver 22 of any conventional type adapted to detect and operate upon a signal of that scanning rate whereby to reconstruct and reproduce the image contained therein on a cathode ray kinescope 24, for example. That is, an electron beam (not shown) within the kinescope is caused to scan a generally rectangular raster on its face 26 by means of suitable line- and field-rate sawtooth energy applied to the deflection apparatus indicated by windings 28. In accordance with conventional practice, the deflection currents applied to the windings are synchronized with the remote transmitter through the agency of synchronizing pulses forming a part of the received composite signal, as is well known. The video portion of the received signal is indicated diagrammatically as being applied to an input electrode (not shown) of the kinescope via lead 30. The pictures thus produced on the luminescent face of the kinescope are focused, via a suitable optical system symbolized by lens 32, onto the image-receiving screen 34 of a television camera tube 36 which may be of any type such as Image Orthicon, Iconoscope and the like capable of scanning the image line by line, whereby to produce a train of video signals representative thereof. An electron beam (not shown) within the camera 26 is deflected at the rates of the local standards which are, in the example, 525 lines with 60 interlaced fields. Sure deflection is accomplished conventionally by electromagnetic energy provided by horizontal and vertical windings which make up the yoke 38. The windings are energized by horizontal (15.75 kc.) and vertical (60 C. P. S.) frequency sawtooth currents furnished them from the deflection generator 40 which is illustrated within the dotted-line rectangle 42 designated "Sync Commensurating Circuit."

The commensurating circuit, as described in general terms supra, has as its function that of rendering the 60 C. P. S. field rate of the local transmitter 44 precisely commensurate with the 50 C. P. S. rate of the incoming signal, whereby the two field rates coincide at regular intervals indicated by times $T_1$, $T_2$ and $T_3$ of Fig. 1. Since each of the individual circuits forming a part of the commensurating apparatus does not constitute a part of the invention, specific circuitry need not be described, except as follows:

As in conventional synchronizing generators, the present apparatus includes an oscillator 46 having a nominal frequency of 31.5 kilocycles per second, which oscillator may be of any convenient variety capable of being frequency-controlled as by means of a reactance tube device 48 operatively connected with it. The output wave of oscillator 46 is divided frequency-wise by a factor of two (2) in circuit 50 whereby to provide a 15.75 kc. wave at lead 52 which is employed to trigger a blocking oscillator (not shown) or other sawtooth wave-forming circuit in generator 40 which furnished the horizontal deflection energy to camera yoke 38. The oscillator frequency is also applied to a chain of dividers indicated by block 54 which ultimately divides by a factor of 525 to produce a 60 C. P. S. wave at terminal 56. The 60 cycle wave is applied to a vertical deflection wave generator in block 40 to provide the vertical deflection energy for yoke 38. As thus far described the deflection apparatus is wholly conventional, except for the fact that the oscillator is not "locked" with the local power supply, which locking is quite unnecessary, as pointed out earlier. Instead, the oscillator is effectively "locked" with the incoming 50 C. P. S. signal to afford the desired commensurate condition, which is accomplished in the following manner: An auxiliary divider chain 58 divides down the 31.5 kc. wave from oscillator 46 by a factor of 630 to provide a 50 C. P. S. wave which is, in turn, applied to a phase comparison circuit 60 together with a sample of the 50 C. P. S. field wave from receiver 22. The circuit 60 may be of any well known form suitable for comparing the relative phase of two input waves and furnishing an "error" voltage proportional to and indicative of any phase difference therebetween. In the instant apparatus, the error voltage from comparison device 60 is supplied to the reactance tube circuit 48 via lead 62 in such manner as to effect any change in the frequency of the oscillator which may be necessary to produce coincidence of the waves in the circuit 60. It is to be noted, from the foregoing, that the local (60 C. P. S.) sync generator is locked in with respect to the remote (50 C. P. S.) transmitter in order to effect the commensurate relationship of waveforms (*a*) and (*b*) of Fig. 1. It is, moreover, on this point where the present invention departs from prior art proposals which contemplate locking of the local generator with the local power supply mains, rather than with the remote transmitter.

Referring again to Fig. 1, and assuming that the kinescope 24 and camera 36 commence their scanning operations simultaneously, it will be seen that the following actions occur for the successive camera fields, by reason of the different scanning rates:

1st camera field: since the camera scan is more rapid than that of the kinescope, the first field will be blank;

2nd camera field: the camera, during this "even line field" (i. e. with respect to interlace), will read off the "even line" components of kinescope field No. 1;

3rd camera field: the camera will read off the "odd line" components of kinescope fields No. 1 and No. 2, since the kinescope will have completed two complete fields by the end of this camera field;

4th camera field: the camera will read off the "even line" components of kinescope fields No. 2 and No. 3;

5th camera field: the camera will read off the "odd line" components of kinescope fields No. 3 and No. 4;

6th camera field: the camera will read off the "even line" components of kinescope fields No. 4 and No. 5;

7th camera field: since this field begins simultaneously with and is completed before the kinescope field No. 6, the camera will read only the odd line components of kinescope field No. 5. Thus, this camera field will contain blank portions resulting in hiatuses in the output signal which are undesirable.

8th camera field: since this camera field begins and ends earlier than the start and finish of kinescope field No. 7, the camera will read off the "even line" components of only kinescope field No. 6 and will, therefore, be incomplete.

9th, 10th, 11th and 12th camera fields: these fields will be complete as in the use of the 3rd, 4th, 5th and 6th camera fields and for the same reasons.

The relationship between the camera fields and those kinescope fields which they scan, respectively, is indicated by the arrows drawn from each of the camera fields to the kinescope fields it reads. Additionally, it should be understood that, in order for any given camera field to be "good," it must have "seen" its portions of both an even and odd kinescope field, in view of the line rate difference.

Thus, it has been demonstrated that, by making the local sync generator commensurate with the incoming signal, it has been made possible to anticipate and, thus, in effect, earmark those local camera fields which are incomplete and, therefore, unfit for transmission. The remaining circuitry of Fig. 2, the timed operation of which is illustrated by the chart of Fig. 1, is concerned with eliminating the undesired fields and substituting useful information therefor. More specifically, it has been shown that the first two camera fields of each group of six beginning coincidentally with a group of five kinescope fields are to be eliminated. In accordance with the invention, information for substitution for the "bad" camera fields is derived by storing earlier "good" fields and using them when required.

Since, in each commensurated group of camera fields, there are two successive fields containing artifacts, it has been found convenient by the applicant to employ two storage tubes 70 and 72 for storing the "good" fields which are to be used in their stead. In particular, storage tube 70 is used to store the fifth camera field of each such group while tube 72 stores the sixth camera field. In the following description of the circuitry of Fig. 2, it will be shown that camera field 5 is stored and substituted for camera field 7 and that camera field 6 is stored and substituted for camera field 8. Similarly, camera fields 11 and 12 are stored and substituted, respectively, for fields 1*a* and 2*a*. Although the invention involves the repetition of camera fields sent at an earlier time, it should be readily apparent that picture quality should not be noticeably affected, since only a slight change in picture can occur in one-thirtieth of a second.

Use is additionally made of the commensurate 60 C. P. S. field sync signals in operating the storage devices, since the "bad" fields occur at regular intervals with respect to the times of coincidence of such signals. Each of the storage tubes may take the form, for example, of a Radechon, a detailed description of which is to be found in an article entitled "Barrier grid storage tube and its operation," by A. S. Jensen, J. P. Smith, M. H. Mesner and L. E. Flory, RCA Review, March 1948. Briefly, the Radechon tube stores video information by way of an electrostatic image and has a single electron beam which can alternately "write" and "read," having the further property that it erases as it reads. By virtue of the fact that it has only one beam, the Radechon is free of problems of registry which are present in the case of tubes having separate beams for performing the two functions. Moreover, it is relatively simple and inexpensive. While the Radechon tube is disclosed, it will be understood that other suitable storage devices may be used in practising the invention.

Means are provided for causing the storage tubes 70 and 72 to store (i. e. write) and read the camera fields in question. These means comprise the circuitry denoted by blocks 74 and 76 which bear the notations "Bias control." In a Radechon, as explained in the above-cited article in RCA Review, there are present a wire mesh barrier grid, a thin layer of insulating material, such as mica and a metal back plate. During writing, an electron beam, modulated by video signals, scans the target assembly to produce an electrostatic image on the front surface of the mica, the potential of the back plate being maintained at some fixed value such as +100 volts. During reading, the potential of the back plate is changed to zero, for example, and the electron beam is made of such intensity as to permit it to erase the image charge, while producing a signal current which varies in accordance with the image. For purposes of simplicity, it will be assumed herein that the storage tubes 70 and 72 are normally provided with the requisite potentials for writing and that the "Bias controls" 74 and 76 increase the beam intensity and alter the back plate potentials of their respective tubes to render them capable of reading.

Figure 3:
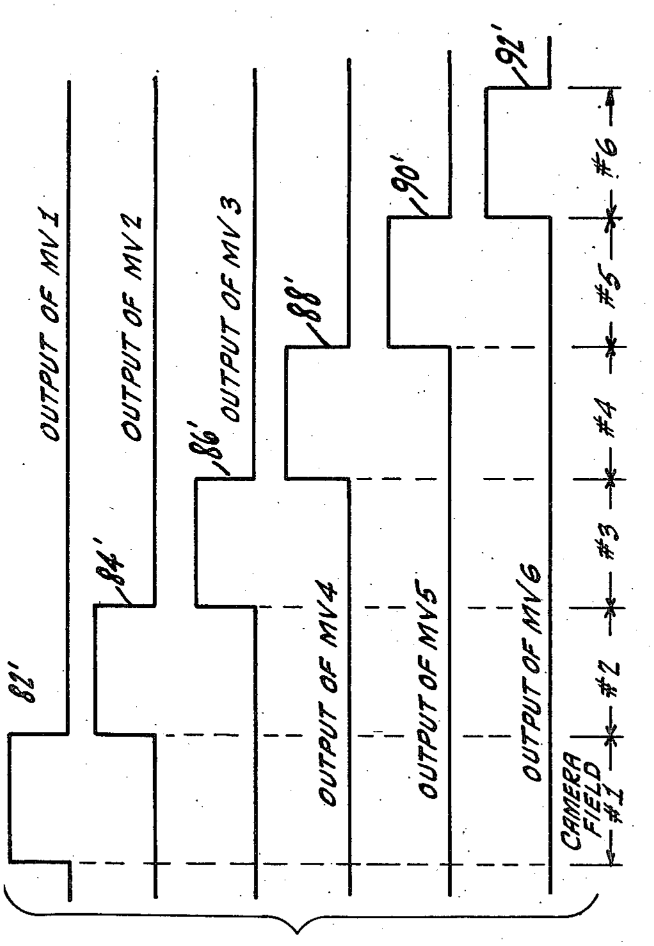
Fig. 3 illustrates a series of waveforms to be described infra.

In Fig. 1, a coincidence circuit 78 receives, at its input terminals, 60 C. P. S. and 50 C. P. S. signals from the circuit 40 and divider. Circuit 78 may be of any form capable of producing an output pulse 80 in response to coincidence of the two input waves, and need not be described in detail, as circuits of this type are well known in the television art. Connected in series with circuit 78 are six counting circuits 82, 84, 86, 88, 90 and 92 which are designated, respectively as $MV_1$, $MV_2$, $MV_3$, $MV_4$, $MV_5$ and $MV_6$. The counting circuits may comprise simple conventional monostable multivibrators, examples of which are described in the textbook "Waveforms," M. I. T. Radiation Laboratory Series, McGraw-Hill Book Co. Basically the multivibrators may be arranged so that each one is triggered by the trailing edge of the output pulse of the preceding multivibrator their timing being such as to produce pulses such as those indicated in Fig. 3 as 82′, 84′, 86′, 88′, 90′ and 92′. It will be noted from Fig. 3 that each of the multivibrator pulses has a duration equal to that of a camera field. As those skilled in the art will understand, even greater timing accuracy may be obtained by applying 60 cycle pulses from generator 40 to each of the multivibrators 82–92 to trigger them in coincidence with the trailing edge of the output pulses from the preceding multivibrator.

Coupled between the output terminal 36′ of the camera tube 36 and the input terminal of transmitter 44 is a normally closed switch 96 designated as "Sw. A" which has as its function that of completing or interrupting the path between the camera and transmitter. Switch "A" is coupled to multivibrators 82 and 84 as shown in Fig. 2 in such manner that it is adapted to be rendered non-conductive (i. e. "off") by each of pulses 82′ and 84′ and for their duration. Also included in the apparatus of Fig. 2 is a normally "open" gate switch No. 1 designated by block 98 operatively connected between the camera output terminal 36′ and storage tube 70 in such manner that it is adapted to be "closed" (i. e. rendered conductive) by a pulse 90′ from multivibrator 90. Gate switch No. 2 (block 100) is similarly connected between the camera terminal 36′ and storage tube 72 and is rendered conductive by pulses 92′ from multivibrator 92. Switch "B" (block 102) which is normally open, is connected between the output signal terminal of storage tube 70 and the input of transmitter 44 and is coupled to multivibrator 82 to receive switch-closing pulses 82′. Switch "C" (block 104), which is also normally "open," is connected in the path between storage tube 72 and transmitter 44 as is adapted to be closed by pulses 84′ from multivibrator 84.

Multivibrators 82 and 84 are also coupled to the storage tube bias controls 74 and 76, respectively, in such manner as to receive from them pulses 82′ and 84′ which place them in condition for biasing their associated storage tubes for reading. As was pointed out supra, the storage tubes are normally conditioned by their bias controls for writing and the pulses from mutivibrators 82 and 84 change their operating potentials as required for reading and erasing the written signals. In the interest of completeness of description, it will also be noted that each of the storage tubes 70 and 72 has associated with it a deflection yoke 70′ and 72′ respectively, which yokes are connected to the local deflection generator 40 (by means not shown) to be energized thereby in synchronism with the camera tube and the two storage tubes are caused to scan simultaneously and in synchronism with each other.

In the operation of the apparatus of Fig. 2, television receiver 22 detects an incoming 50-field-per-second signal which is reproduced on kinescope screen 26 and focused onto the target of camera tube 36, which scans at a 60-field-per-second rate, as explained. The sync commensurating circuit No. 2 renders the 50 cycle and 60 cycle deflection wave coincident at regular intervals as shown by waveforms (*a*) and (*b*) of Fig. 1, which intervals render coincidence circuit 78 operative to produce trigger pulses 80. With the apparatus connected as shown, the following events occur for the successive fields of camera tube 36 beginning at time $T_1$ and as indicated by the chart of Fig. 1.

Since the first camera field will be blank, there will be no signal from either the camera or the storage tube, but the circuit will be in the condition noted on the chart, namely with switch "A" open (i. e. "off"), switch "B" closed (i. e. "on") and with the storage tube 70 reading. Assuming that the apparatus was turned on at exactly time $T_1$, no video signal will be produced for the first camera field. During the second camera field, an incomplete signal would have been produced in the camera, it is again effectively disconnected from the transmitter on the opening of switch "A." Although switch "C" is closed and storage tube 72 is biased for reading, no signal will be applied to the transmitter, in view of the fact that no image was stored in the tube 72.

During the preceding camera field times, the kinescope 24 produced two 50-cycle fields which places the apparatus in condition for normal operation with camera 36 for camera fields No. 3 through No. 6. Thus, for camera fields No. 3 and No. 4, switch "A" is closed and switches "B" and "C" are open as are the gate switches 98 and 100, so that those camera fields are applied to the transmitter 44 and no storage is effected except that intrinsic in the operation of camera tube 36.

As has been explained camera field No. 5 is substituted for camera field No. 7 and camera field No. 6 is substituted for camera field No. 8. These acts are accomplished as follows: At the beginning of camera field No. 5, pulse 90' closes gate switch 98 so that the signal from camera 36 is applied to both the transmitter and to storage tube 70 which is normally biased for writing. Thus, camera field No. 5 is stored in tube 70, after which gate switch 98 is opened (i. e. by the trailing edge of pulse 90'). The leading edge of pulse 92' closes gate switch 100 at the start of camera field No. 6 so that that field is stored in tube 72.

During camera field No. 7, however, pulse 82' opens switch "A" to disconnect the camera 36 from transmitter 44, closes switch "B" to connect the output signal terminal of storage tube 70 to the transmitter and sets bias control 74 for reading so that the signal which was stored in the tube during field No. 5 is transmitted in place of field No. 7. Similarly, during camera field No. 8, pulse 84' opens switch "A," closes switch "C" and biases storage tube 72 to read off the stored information of camera field No. 6 which is applied to the transmitter in place of the field numbered No. 8.

Camera fields No. 9 and 10 are transmitted as fields No. 3 and No. 4 (without storage) and camera fields No. 11 and No. 12 are also transmitted but additionally these latter fields are stored for substitution for fields 1*a* and 2*a*. Since the chart of Fig. 1 gives a field-by-field description of the various steps in the apparatus, it will be understood that the cycle is repeated every time the 50-cycle deflection and 60-cycle deflection coincide, which coincidence is anticipated by virtue of the fact that the two frequencies are made commensurate in circuit 42.

Figure 5:
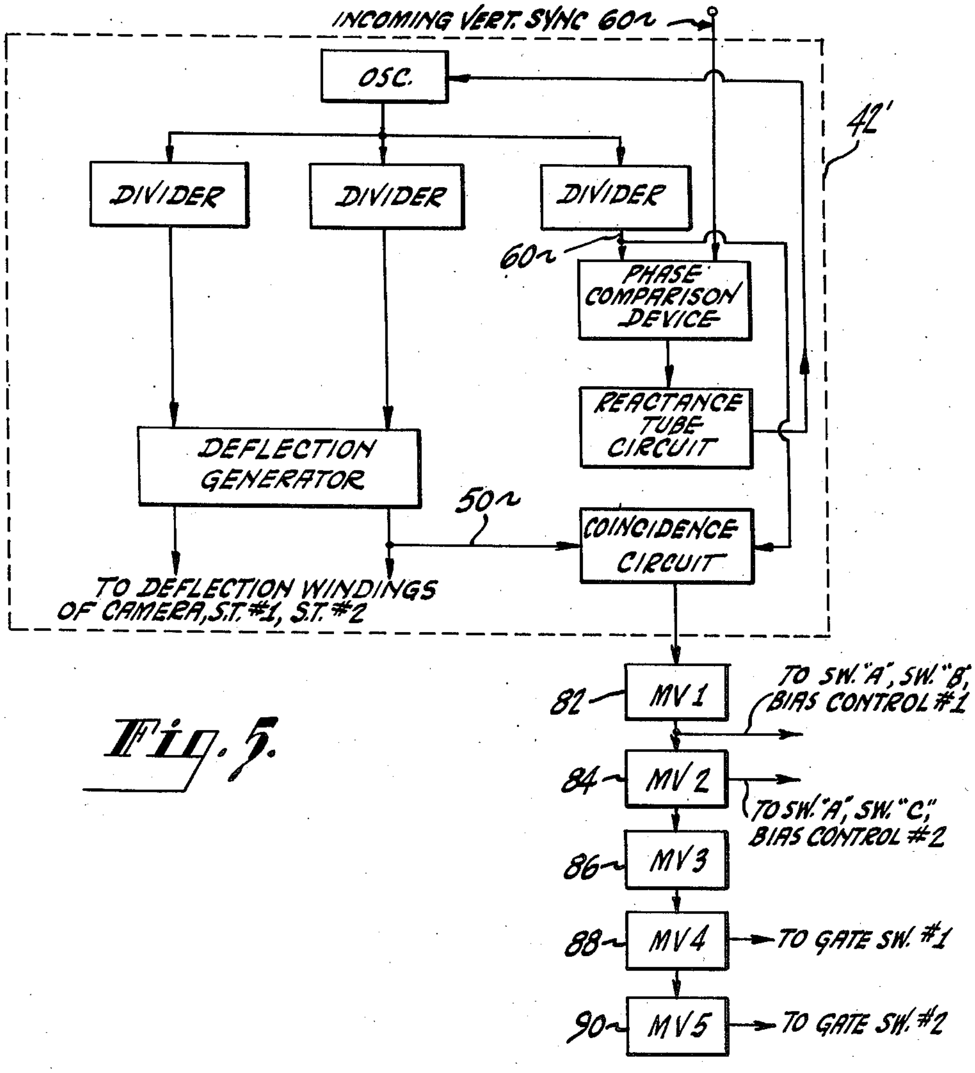
Fig. 5 is a block diagram of another form of the invention.

Fig. 5 illustrates the second possibility in signal standards conversion alluded to above, namely, that wherein the incoming field frequency is greater than the local frequency. Waveforms (*a*) and (*b*) of Fig. 5 show the relationship, respectively, of the incoming 60-field-per-second signal and the local, or out-going, 50-field-per-second signal. The two signals, if commensurate, coincide at regularly recurring times $T_4$, $T_5$ and $T_6$, just as in the case of the reverse situation of Fig. 1, except that, in Fig. 5, the cycle occurs after every five camera fields. In accordance with the present invention, the two field scanning frequencies can be made commensurate, as in the example of Fig. 1, and "good" camera fields substituted for "bad" fields. In order that a better understanding may be had of this relationship, the several fields will be described separately.

Assuming that the physical arrangement is similar to that of Fig. 2, that is, with the kinescope image of the received signal focused onto a camera target, and with both commencing their scanning operations at time $T_4$, the results will be as follows:

1st camera field: Since the kinescope scans more rapidly than the camera, kinescope field No. 1 will be scanned by the camera to produce the odd line components thereof. As will become apparent from the description of camera field No. 6, however, camera field No. 1 is not "good" and is not used.

2nd camera field: This field will see the even line components of kinescope fields No. 1 and No. 2 but, as will be seen from the description of camera field No. 7, this field also contains artifacts.

3rd camera field: This field sees the odd line components of kinescope fields No. 2 and No. 3.

4th camera field: This field sees the even line components of kinescope fields No. 3 and No. 4.

5th camera field: This field sees the odd line components of kinescope fields No. 4 and No. 5. (Since the camera field, in this case begins before the kinescope field No. 6, it will not see any of that kinescope field.)

6th camera field: Since no preceding camera field has seen the even line components of kinescope field No. 5, this camera field will see those components of that kinescope field and of kinescope fields No. 6 and No. 7. Hence, camera field No. 6 contains excess brightness and, therefore, is not desirable.

7th camera field: This will see the odd line components of kinescope fields No. 6, No. 7 and No. 8 and will, therefore, have excess brightness.

The 8th, 9th and 10th camera fields will be good since each will see its corresponding line components of exactly two kinescope fields.

From the foregoing, it should be apparent that the fields containing artifacts may be detected in advance so that "good" fields may be substituted for them. The apparatus for accomplishing such substitution may be substantially the same as that of Fig. 1 and, therefore, need not be described again in detail. In this case, the sync commensurating circuit 42' in Fig. 5 contains a deflection generator 40' for providing 50 cycle field deflection energy to the camera tube and storage tubes, rather than 60 cycle energy and the line frequency is derived in accordance with the local standards. The local oscillator 46', however, is controlled to maintain a commensurate status with respect to the incoming field frequency for the same reasons. The apparatus of Fig. 5 differs mainly from that of Fig. 2 in that only five multivibrator or counting circuits are present, namely, those indicated by blocks 82, 84, 86, 88 and 90. Multivibrator 82 is connected to switches "A" and "B" and bias control 74 for performing the same functions as described with respect to multivibrator 82 of Fig. 1. Similarly, multivibrator 84 is connected to switches "A" and "C" and bias control 76. Multivibrator 86 serves as a counting means, while multivibrators 88 and 90 are coupled, respectively, to gate switches No. 1 and No. 2.

Figure 4:
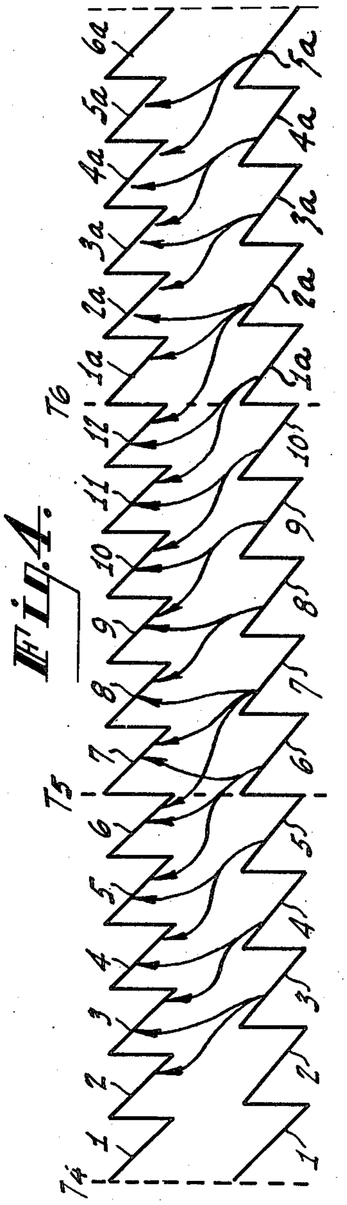
Fig. 4 is an illustration of another situation in which the invention has utility.

In the operation of the apparatus of Fig. 5 in the situation depicted by Fig. 4, fields No. 4 and No. 5 of the camera are, in addition to being transmitted, stored in storage tubes 70 and 72, respectively. This storage is accomplished just as in Fig. 2, except, of course, that gate switch No. 1 is closed by a pulse from multivibrator 88 (instead of multivibrator 90) and that gate switch No. 2 is closed by a pulse from multivibrator 90 (instead of 92). In other words, since there are five camera fields per cycle in Fig. 4, as opposed to six in Fig. 1, one less counting stage is required for the former situation. At time $T_5$, switch "A" is opened, switch "B" is closed and the stored camera field No. 4 is fed from tube 70 to the transmitter. During camera field No. 7, switch "A" is open and switch "C" is closed so that the stored camera field No. 5 is applied to the transmitter from tube 72.

While it is not included in the drawing, the invention also contemplates the possibility that kinescope fields 1, 6, 7 and 12 may be blanked out entirely in order to preclude their latent brightness from producing undesired brightness level changes in succeeding fields of the camera tube. Otherwise, that is if "double exposure" of the camera tube is not considered as troublesome, the kinescope may be permitted to run without blanking. In either event, the camera fields 1, 2, 6 and 7 are replaced at the transmitted input terminal by camera fields preceding them, as described.

In view of the foregoing, it should be apparent that the present invention exploits the possibility of locking two television systems together with respect to their field rates in order to control the timing of the local scans. This permits the use of relatively simple, high-definition apparatus such as the kinescope and camera tube during the greater part of the time. Moreover, the remaining portions of the signal may be stored in tubes which present no problems as to registry or flicker.

Persons skilled in the art will recognize that the invention is susceptible of use with a variety of counting circuits, image-reproducing devices, pickup devices and storage means, and that the devices named herein are merely by way of example.

Having thus described my invention, what I claim as new and desire to secure by Letters Patent is:

1. Television apparatus comprising: a source of video signals derived from scanning fields in accordance with a first field scanning rate; means coupled to said source for reproducing an image from said signals; a utilization circuit having an input terminal; a television camera device having scanning means associated therewith for scanning such image at a field rate different from said first rate; means defining a signal path from said camera to said input terminal; a source of deflection energy coupled to said camera scanning means and to said source of signals for rendering said camera field scanning commensurate with said first field scanning rate; video signal storage means; means for determining coincidence of corresponding portions of respective fields of said first and second rates; means for selectively coupling video signals from said camera to said storage means and for selectively applying stored signals therefrom to said utilization circuit input terminal; and means for effectively disconnecting said signal path between said camera and said utilization circuit input terminal during times when said stored signals are applied to said terminal, said selective coupling means and said last named means being responsive to said coincidence determining means.

2. Television apparatus comprising: a source of video signals derived from scanning fields in accordance with a first field scanning rate; means coupled to said source for reproducing an image from said signals; a utilization circuit having an input terminal; a television camera device having scanning means associated therewith for scanning such image at a field rate different from said first rate; means defining a signal path from said camera to said input terminal; a source of deflection energy coupled to said camera scanning means and to said source of signals for rendering said camera field scanning commensurate with said first field scanning rate; video signal storage means; means for determining coincidence of the beginnings of respective fields of said first and second rates; means for selectively coupling video signal from said camera to said storage means and for selectively applying stored signals therefrom to said utilization circuit input terminal; and means for effectively disconnecting said signal path between said camera and said utilization circuit input terminal during times when said stored signals are applied to said terminal, said selective coupling means and said last named means being responsive to said coincidence determining means.

3. The invention as defined by claim 1 wherein said means defining a signal path between said camera to said utilization circuit input terminal comprises a switch and wherein said means for selectively applying video signals from said storage means to said input terminal comprises a second switch, said first and second switches being coupled to said coincidence determining circuit.

4. Television apparatus comprising; a source of video signals derived from field scansions in accordance with a first field scanning rate of $N_1$ fields per second; means coupled to said source for reproducing an image from said signals; a utilization circuit having an input terminal; television camera means having scanning means associated therewith for scanning such image at a field rate of $N_2$ fields per second, where $N_2$ is different from $N_1$; means defining a signal path from said camera means to said utilization circuit input terminal; a source of deflection energy of field rate $N_2$ fields per second coupled to said camera scanning means and to said source of signals for rendering said camera field scanning commensurate with said first field scanning rate such that corresponding portions of said fields coincide at regular intervals whose repetition rate is proportional to the expression $N_2:N_1$, where $N_2$ and $N_1$ are, respectively, the smallest integers to which $N_2$ and $N_1$ may be reduced by division with a common factor; video signal storage means; means for determining coincidence of corresponding portions of respective fields of said first and second rates; means for selectively coupling video signals from said camera to said storage means and for selectively applying stored signals from said storage means to said utilization circuit input terminal; and means for effectively disconnecting said signal path between said camera and said utilization circuit input terminal during times when said stored signals are applied to said terminal, said selective coupling means and said last-named means being operatively connected to said coincidence determining means.

5. The invention as defined by claim 4 including means for rendering operative said means for selectively coupling video signals to said storage means for camera fields occurring at intervals $N_2-1$ and at $N_2$ from coincidence, whereby such fields are stored.

6. The invention as defined by claim 5 including means for rendering operative said means for selectively applying stored signals to said utilization input terminal for camera fields occurring at intervals $N_2+1$ and $N_2+2$, whereby to apply thereto said camera fields which occurred at intervals $N_2-1$ and $N_2$, respectively.

7. The invention as defined by claim 4 wherein said coincidence determining circuit comprises means for detecting coincidence of the commencement of said different fields.

8. The invention as defined by claim 5 wherein said storage means comprises a separate storage device for each of fields $N_2$ and $N_2-1$.

No references cited.